July 18, 1950 R. C. NEWHOUSE ET AL 2,516,069

OBSERVER-CONTROLLED TELEVISION SYSTEM

Filed July 29, 1947 3 Sheets-Sheet 1

INVENTORS: R. C. NEWHOUSE
F. W. REYNOLDS
BY
Hugh S. Wertz
ATTORNEY

July 18, 1950 R. C. NEWHOUSE ET AL 2,516,069

OBSERVER-CONTROLLED TELEVISION SYSTEM

Filed July 29, 1947 3 Sheets-Sheet 2

INVENTORS: R. C. NEWHOUSE
F. W. REYNOLDS

BY Hugh S. Wertz

ATTORNEY

INVENTORS: R. C. NEWHOUSE
F. W. REYNOLDS
BY
Hugh S. Wertz
ATTORNEY

UNITED STATES PATENT OFFICE 2,516,069

OBSERVER-CONTROLLED TELEVISION SYSTEM

Russell C. Newhouse, Millburn, and Frederick W. Reynolds, Ridgewood, N. J., assignors to Bell Telephone Laboratories, Incorporated, New York, N. Y., a corporation of New York Application July 29, 1947, Serial No. 764,450

3 Claims. (Cl. 178—6.8)

This invention relates to a television system, and particularly to apparatus for effecting remote control of a television camera.

The invention relates generally to the type of remote control television systems in which various movements of the camera, such as those having to do with the pointing of the camera and the focusing of the camera lens, are under the control of an observer who may be stationed at a distant point and have under his observation the corresponding transmitted television image reproduced upon the viewing screen. The operation of such a system, while analogous to that of an optical periscope in that it permits the observer to controllably view scenes not in his direct line of vision, differs in that it substitutes electrical for direct optical transmission of the image of the field of view of the camera, and substitutes remote electrical controls for mechanical linkages. Assuming adequate transmission of the television currents to the viewing screen of the distant observer's station, the practical limitations imposed upon such a television system are those having to do with the adequacy and efficiency of the electrical linkages by means of which accurate remote control of the camera by the observer must be effected.

A major object of the present invention is to control accurately and effectively the television camera movements even when the location of the television receiver where the observer is stationed is so remote from the camera as to be limited only by the distance over which it is practicable to transmit the television signals.

In attaining this object the invention contemplates the provision of an organization employing control signal currents that may be generally of the character of those employed in long distance telephone or telegraph communication, and which may be conveyed over a transmission line or medium such as is commonly employed in long distance communication systems of the type mentioned. The invention further contemplates an organization in which the plurality of control signal currents of this type necessary for the separate and independent control of the required different movements of the television camera may be transmitted from the receiving to the sending station preferably over a single physical circuit rather than over separate circuits, one for each control current.

To this end the invention disclosed herein makes use of a phase shift method of control applied to alternating currents or systems of pulses of regular or uniform rates of repetition. The observer at the receiving station is provided with means for introducing a phase difference between two identical frequency waves or systems of pulses having the same frequency of repetition. The waves thus produced are transmitted to the sending station, and there the phase difference between them determines the magnitude and direction of a control current which varies the speed and direction of rotation of a driving motor that controls the particular corresponding camera movement. A similar arrangement is provided for each of the camera movements that it is desired to control.

One of the identical frequency waves is transmitted to the camera station without phase alteration as a reference frequency wave. Each of the other transmitted identical frequency waves has its phase shifted, by means under the control of the observer at the receiving station, in accordance with the magnitude and direction of the corresponding control current it is desired to produce at the camera station. The reference frequency wave and each of the phase shifted waves are preferably transmitted as modulations of an equal number of carrier frequency waves constituting separate channels of a single carrier line extending between the stations. At the camera station the reference and phase shifted waves are reproduced and the magnitude and direction of the phase difference between the reference wave and each observer-controlled phase shifted wave determes the speed and direction of rotation of the corresponding camera motor.

The manner in which the above and other objects of the invention are realized will now be described in greater detail by reference to the accompanying drawings, in which.

Figure 1:
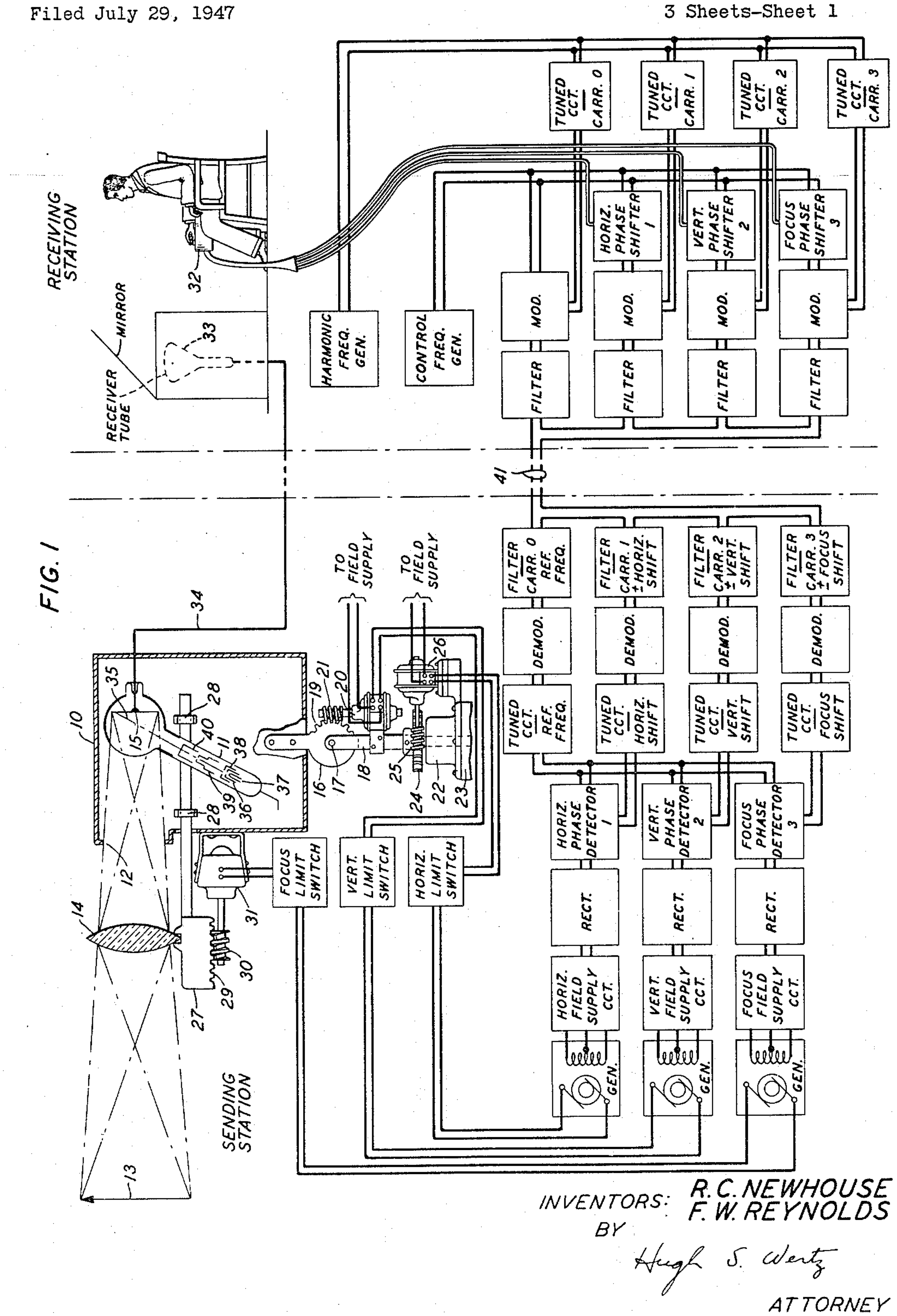
Fig. 1 is a schematic illustration of an embodiment of the invention showing the sending station, the receiving station and, in block form, the units of the electrical system whereby the two stations are interconnected.

Referring to Fig. 1, which shows, for purposes of illustration, a schematic embodiment of a system in accordance with the invention, the television camera may comprise a housing 10 containing a television pick-up device 11 of any suitable type, the latter being so mounted with respect to an aperture 12 in the housing that the field of view 13 may be imaged by an objective lens 14 on the image receiving device 15 of the pick-up device 11. The housing 10 is fixed to a bracket 16 pivoted to rotate about a horizontal axis 17 on a pedestal 18. The bracket 16 may be provided with gear teeth 19. A reversible motor 20 may be mounted on the pedestal 18 and arranged to drive a worm 21 which engages with the gear teeth 19. Thus, operation of the motor will cause the housing 10 to rotate in a vertical plane in one direction, while reversal of the direction of rotation of the motor will reverse the movement of the housing.

The pedestal 18 is in turn pivotally mounted on a fixed member 22 for rotation on a vertical axis 23. The drive for the pedestal 18 may be similar to that above described, the pedestal being driven with a worm gear 24 which meshes with a worm 25. The worm 25 is driven by a reversible motor 26 in one sense or the other causing the pedestal 18, and with it the camera housing 10, to rotate in a corresponding sense in the horizontal plane.

The objective lens 14 is arranged to be movable toward or away from the pick-up device. To this end it may be fixed in a lens mount 27 arranged to move axially in guides 28 fixed to the housing 10. The movement may be imparted to it through a rack 29 with which meshes a worm 30 driven by a reversible motor 31 fixed to the housing 10.

With this arrangement, by operation of the motors 20, 26 and 31 in the proper sense or in any desired order, the camera may be aimed in any direction and objects at any distance from it within the limits imposed by the focal length of the objective lens 14 may be brought into sharp focus on the screen 15 of the camera 11. The three motors 20, 26, and 31 may be of any desired type, and fully to realize the object of the invention should be reversible. For this reason direct current separately excited field motors are preferred. Field windings and direct current sources, which of course must be provided, may be of any suitable type.

The pick-up device 11 may comprise an evacuated envelope containing in one end thereof a photosensitive mosaic screen 15 backed by a conductor plate from which, when the field 13 is imaged on the screen 15 and the latter is scanned by an electron beam 35, image currents may be drawn. These image currents may be conveyed through a suitable transmission medium, indicated as the conductor 34, to the receiver tube or image synthesizing apparatus 33 at the receiving station.

The beam electrons of the electron beam 35 may be derived from a suitably shaped and treated cathode element 36 rendered thermionically active by a heater 37. The electrons may be accelerated toward the beam receiving end of the vessel and focused to a sharp spot on the screen by suitably shaped and disposed electrodes 38, 39, 40 which may be supplied with suitable operating potentials in well-known manner. Deflection of the beam 35 in the course of the scanning operation may be accomplished electrostatically or electromagnetically.

The image synthesizing apparatus at the receiving station may be of any desired type. It may comprise, for example, an evacuated vessel containing a cathode, a heater, accelerating and focusing electrodes and a fluorescent beam receiving screen and means for causing the cathode beam to scan the screen. The scanning means may be electrostatic or electromagnetic as preferred. These means may comprise deflecting coils, saw-tooth wave generators, and amplifiers. Such apparatus is well known in the art and is indicated in the figure merely by the outline of a cathode-ray tube of conventional form.

The illustrative embodiment of the invention herein disclosed comprises the sending station where the camera 10 with its associated pick-up device 11 is located, the receiving station with its associated receiving tube or image synthesizing apparatus 33 and observer's controlling apparatus 32, the transmitting medium or conductor 34 for conveying the television currents from the pick-up device 11 at the sending station to the receiving tube 33 at the receiving station, and the control line 41 for conveying the control currents from the observer's controlling apparatus at the receiving station to the controlled devices for effecting the desired camera movement and adjustments at the sending stations.

Figure 2:
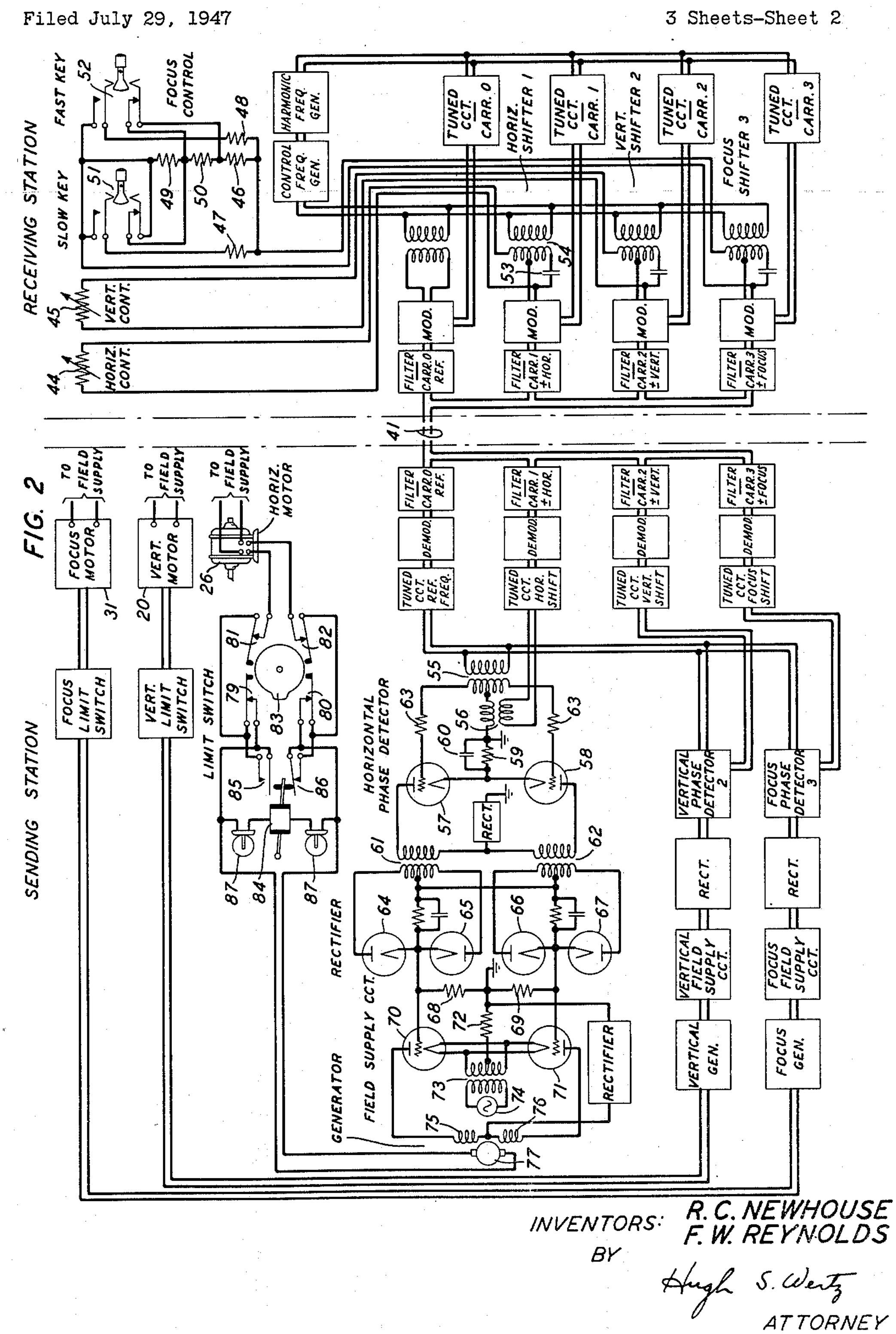
Fig. 2 is a circuit diagram of the electric interconnections between the controlling elements of the receiving station and the controlled elements of the sending station with some of the units of elements shown diagrammatically and other of the units in block schematic form.

The elements that constitute the interconnecting remote control organization between receiving and sending stations will first be briefly outlined as they are illustrated in block schematic form in Fig. 1, after which the circuit arrangements of certain representative units of the interconnecting elements as illustrated in Fig. 2 will be described.

In the specific embodiment of the invention illustrated, there are, as has been stated, three different movements of the camera at the sending station that are subject to the control of the observer at the receiving station; namely, the tilt or pointing of the camera in elevation, the horizontal rotation or pointing of the camera in azimuth, and the focusing movement of the camera objective lens. Each of these movements is under the control of a separate switch or set of switches at the observer's position. The effect of the movement of each of the three control devices by the observer is to shift the phase of the wave in a corresponding transmission branch of a control frequency generator with respect to the phase of the wave in another transmission branch of the same generator that is transmitted without phase displacement as a reference frequency. In the drawings the blocks representing the various unitary assemblages of circuits and apparatus bear legends that for the most part adequately identify them, and except where necessary no additional numerical identification of these blocks will be employed in the description.

The control frequency generator has four identical outputs one of which extends directly to the upper one of the four modulators shown at the receiving station and the remaining three extend to the other three modulators by way of horizontal phase shifter 1, vertical phase shifter 2 and focus phase shifter 3, respectively. The phase of the wave in the output extending to horizontal phase shifter 1 is shifted in one direction or the other in relation to the phase of the reference frequency wave by a movement of the common operating lever of switch key 42 (see Fig. 3) at the controlling position from one side to the other, and controls the horizontal or azimuth movement of the camera; the phase of the wave in the output extending to vertical phase shifter 2 is shifted in one direction or the other in relation to the reference frequency phase by the movement of the lever of switch key 42 toward or away from the observer, and controls the tilt or vertical movement of the camera; and the phase of the wave in the output to the focus phase shifter 3 is shifted in one direction or the other in relation to the reference frequency phase by the movement toward or away from the observer of either one of the two levers of switch key 43, and brings about the movement of the objective lens 14 of the camera with respect to the image receiving mosaic 15 to lengthen or shorten the focus of the camera. As will hereinafter be described, the change of focus is effected at a faster or slower rate of speed dependent upon which of the two levers of switch 43 is manipulated.

Instead of employing four control transmission lines between the receiving station and the sending station, line economy is effected in the present embodiment of the invention by transmitting each of the four controlling waves as a modulation of a separate carrier frequency and applying the four carrier channels to a single line extending between the two stations. To accomplish this result a harmonic frequency generator is provided at the receiving station, and each of the four harmonics produced is selected by a corresponding tuned circuit and applied to the associated modulator. Carrier 0 and the unaltered wave from the control frequency generator are combined in the first modulator; carrier 1 and the output of horizontal phase shifter 1 are combined in the second modulator; carrier 2 and the output of vertical phase shifter 2 are combined in the third modulator; and carrier 3 and the output of the focus phase shifter are combined in the fourth modulator. The output of each of these modulators is applied to transmission line 41 by filters each of which selects the corresponding carrier wave and its associated control frequency plus and minus side bands, these control frequencies consisting of the unshifted reference frequency wave and the three other identical frequency waves the phases of which have been shifted.

At the other or sending station end of transmission line 41, each of the carrier frequencies with its control frequency side bands is selected by means of an appropriately tuned filter and passes to an associated demodulator from which the control frequency transmitted by the carrier is selected by an associated tuned circuit and applied to the camera controlling circuits. Each of these three controlling circuits, one for each of the camera movements to be controlled, is represented in the drawings as a succession of assemblages of circuits and apparatus including serially a phase detector, a rectifier, a field supply circuit, a generator and a limit switch, the circuit thence extending to the corresponding motor. The input circuit of each of the three phase detectors has connection not only with the tuned circuit that supplies the phase shifted control frequency wave appropriate to that particular phase detector, but also has connection with the tuned circuit that supplies the reference frequency or control frequency wave of unshifted phase.

The particular manner in which the circuits are organized and operated to give the observer at the receiving station control over the movements of the camera at the sending station will be explained by reference to Fig. 2. The particular one of the circuits illustrated diagrammatically at the sending station in Fig. 2 is the one by means of which the observer exercises control over the horizontal or azimuth movement of the camera. The circuits at the sending station for controlling the vertical and focusing movements of the camera are like the horizontal control circuit and are represented merely by appropriately designated blocks. At the receiving station the switches and phase shifting circuits for each of the three controls exercised by the observer are shown diagrammatically.

Figure 3:
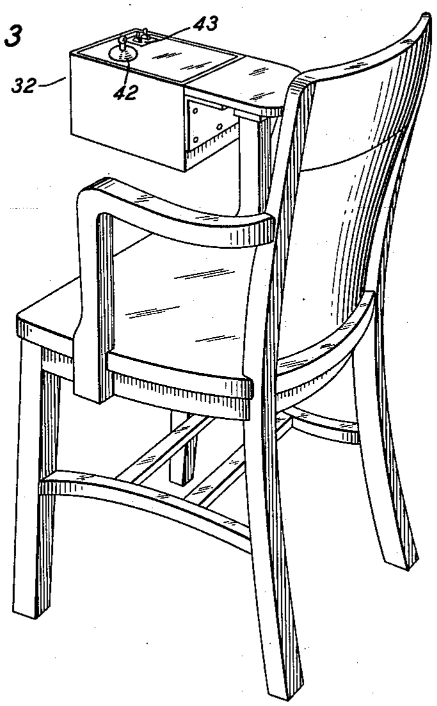
Fig. 3 shows the observer's chair at the receiving station equipped with the phase shifting switching apparatus by means of which the observer controls the camera movements at the sending station.

The means whereby the observer at the receiving station is enabled to control the phase shift that brings about the control of the camera motor at the sending station consists of manually operated resistance varying elements. These are the horizontal control resistance 44, the vertical control resistance 45 and the focus control resistances 46, 47, 48, 49 and 50. Of the latter, the resistances 47 and 49 are controlled by the slow key 51 and the resistances 48 and 50 are controlled by the fast key 52. Each of the control resistances 44 and 45 has a normal value which may be increased or diminished by the movement of the operating lever 42 (Fig. 3). A sidewise movement of the lever 42 in one direction or the other from its normal position increases or decreases the value of resistance 44; and a forward or backward movement of the lever 42 from its normal position increases or decreases the value of resistance 45.

The focus control resistances are so connected that the resistance 46 is included in circuit at all times. When the lever of slow key 51 is operated to close its upper contacts, resistance 47 is connected across the circuit in shunt with resistance 46, and the resistance across the main circuit conductors is thus lowered. When slow key 51 is operated to open its lower contacts, the normal short circuit about resistance 49 is opened, thus increasing the resistance across the main circuit path by including resistances 49 and 46 in series. When the lever of fast key 52 is operated to close the upper contacts of the key, the resistance across the main path is reduced by the inclusion of resistance 48 in shunt with resistance 46. When the lever of fast key 52 is operated to open its lower contacts, the resistance across the main circuit path is increased by the opening of the normal short circuit about resistance 50 and the inclusion of that resistance in series with resistance 46. The values of the various focus control resistances are so chosen that the resistance variation both below and above normal resistance effected by the operation of the slow key 51 is less than the resistance variation below and above normal produced by the operation of the fast key 52.

The horizontal control, vertical control and focus control resistances form the resistance elements in the corresponding phase shifting networks of horizontal shifter 1, vertical shifter 2 and focus shifter 3. The other elements in each of these networks comprise a condenser 53 and the secondary winding of a transformer 54. The control resistance and the condenser 53 have one terminal of each connected together and the other terminal of each connected respectively to the two ends of the transformer secondary winding, the primary winding of the transformer being directly connected with the control frequency generator. The input of the associated modulator has one terminal connected with the conductor joining the condenser 53 and associated control resistance and the other terminal connected with the mid-point of the transformer secondary winding.

In the phase shifter thus produced, the phase angle of the control frequency wave applied to the modulator input is determined by the reactance-to-resistance ratio of the condenser 53 and the associated variable control resistance. If the ratio is unity, the phase of the wave applied to the modulator input is in quadrature with the phase of the control frequency generator wave; and by varying the value of the control resistance the phase of the wave applied to the modulator may be shifted through a wide angle above and below the 90-degree or quadrature phase.

Figure 4:
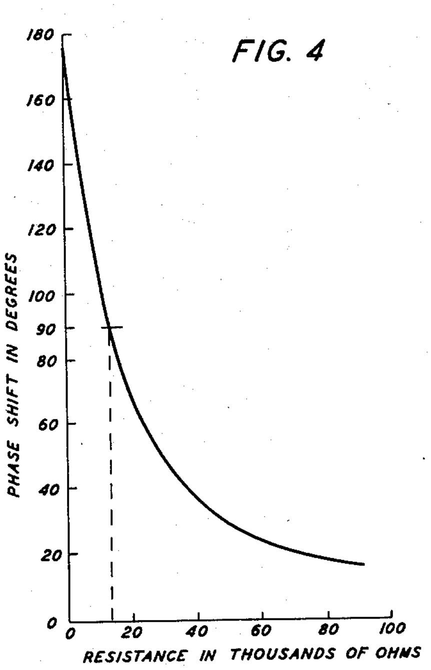
Fig. 4 is a curve illustrating the variation of phase shift with resistance in a specific phase shifter.

An example of the phase shift that may be produced by variation of the value of the control resistance is illustrated by the curve shown in Fig. 4 of the drawings. The ordinate values represent the amount of phase shift in degrees between the input frequencies, and the abscissa values represent the resistance of the resistance element in the network required to produce the phase shift as indicated by the plotted curve. In the specific case represented by the curve of Fig. 4, the condenser 53 of the network had a value of 0.2 microfarad and a 60-cycle control frequency was used. The equivalent reactance of condenser 53 at this frequency was approximately 13,250 ohms; that is, the reciprocal of the product of $2\pi$ multiplied by the frequency in cycles per second and by the capacitance in farads. To produce a quadrature or 90-degree phase shift the ratio of reactance to resistance in the phase shifting network must be unity. That this is the case is indicated by the point of projection, at about 13,250 ohms, on the abscissa base that corresponds on the curve to the 90-degree point on the ordinate of Fig. 4.

The phase shift angle produced in the network is twice the angle whose tangent is the reactance to resistance ratio. Thus the ratio between the condenser reactance of 13,250 and a control resistance of 13,250 is unity. This is the numerical value of the tangent of 45 degrees, and twice this angle is 90 degrees, which is the phase shift angle produced by this unity ratio. To produce a phase shift greater or less than 90 degrees, the value of the control resistance is decreased or increased from its normal quadrature value. In the particular instance represented by the curve of Fig. 4, with the network condenser having a value of 0.2 microfarads, the phase angle between the two input frequencies was variable from a maximum of 173 degrees when the resistance value in the network was minimum to approximately 17 degrees when the resistance had its maximum value of 100,000 ohms.

Referring particularly to Fig. 2, and to the diagram there shown of the horizontal control circuit that is representative of the other two control circuits, the reference frequency, or control frequency of unshifted phase, is transmitted to the sending station as a modulation of carrier 8, while the control frequency the phase of which is shifted in horizontal shifter 1 by manipulation of the horizontal resistance control 44 is transmitted to the sending station as a modulation of carrier 1. The reference frequency and the horizontal control frequency are conjugately impressed upon the input circuit of the phase detector tubes 57 and 58 which, although shown as separate tubes, may conveniently be a twin triode tube. Plate current for the operation of these tubes is provided by a rectifier. The negative terminal of the rectifier is connected with the cathodes of the tubes 57 and 58 by way of a biasing resistance 59 shunted by a condenser 60 preferably of large capacitance, and the positive terminal of the rectifier is connected by way of the primary windings of transformers 61 and 62 with the plates of tubes 57 and 58 respectively. A grid resistance 63 is included in the grid circuit of each of the tubes 57 and 58 to limit the grid current drawn when the grids swing positive.

The secondary windings of transformers 61 and 62 are each connected with a full wave rectifier including the tubes 64 and 65 in the case of transformer 61, and the tubes 66 and 67 in the case of transformer 62. The output current from each rectifier circuit flows through a separate resistor, 68 and 69 respectively, to ground. The voltage developed across resistance 68 is applied to the grid of tube 70 and that developed across resistance 69 is applied to the grid of tube 71. The two tubes and their associated elements act as a balanced amplifier circuit for supplying current for the generator fields 75 and 76. The filaments of tubes 70 and 71 are heated by current supplied from the alternating current source 74 by way of transformer 73; and current is supplied for the energization of the field windings 75 and 76 under the control of the plate filament circuit of tubes 70 and 71, respectively, by means of a rectifier that includes in the common filament return circuit the biasing resistance 72. The field windings 75 and 76 are differentially connected so that the armature 77, constantly driven by a motor, not shown, develops an electromotive force only when there is an inequality in the currents flowing through the differential field windings 75 and 76. The direction and degree of unbalance in the field windings 75 and 76 determine the polarity and magnitude of the current produced in its output circuit by the armature 77.

The current produced by the rotation of armature 77 is transmitted to the horizontal movement motor 26 of the camera by way of the horizontal limit switch apparatus. This apparatus is provided for limiting the angle through which the camera may be swung horizontally, and a similar organization is included in the circuits over which the vertical tilting of the camera and the focusing of the camera are effected. In the horizontal limit switch of the organization diagrammatically shown certain switches are operated to open the energizing circuit of the driving motor 26 by means of a cam 83 associated with the horizontal turntable upon which the camera is mounted. The switch 79 is opened by cam 83 when the camera reaches the limit of its movement in a clockwise direction, and contact 80 is operated when the camera reaches the limit of its movement in a counter-clockwise direction. If a situation should arise in which the opening of switch 79 fails to stop the clockwise swing of the camera, a slight additional movement of the turntable causes cam 83 to open contact 81; and similarly a slight additional counter-clockwise rotation of the turntable after switch 80 is opened causes cam 83 to open contact 82. The opening of any of these contacts interrupts the energizing circuits of horizontal motor 78 and stops the rotation of the camera.

Bridged across the conductors of the circuit extending from armature 77 to motor 26 is a polarized relay 84, two resistors in the form preferably of tungsten lamps 87 being included in series in the branch through the winding of the polarized relay 84. The relay is so polarized that when the polarity of the current from armature 77 is such as to cause the rotation of the turntable in a clockwise direction, the armature of the relay is thrown in a direction to close associated contacts 86, and when the polarity of the current from armature 77 is such as to cause rotation of the turntable in a counter-clockwise direction the armature of polarized relay 84 is moved into a position that holds contacts 85 closed. As shown in the drawing, the position of the polarized relay armature is such as to indicate that the polarity of current in the circuit is that necessary to rotate the motor 26 and the driven turntable in a direction such as to cause the opening of contacts 79 at the limit of the clockwise rotation of the turntable. When cam 83 reaches the limit established by the circumferential position of the operating lever of switch 79, that switch is opened and motor 26 and the turntable come to rest.

But there is a circuit controlled by polarized relay contacts 85 in parallel with the limit switch contacts 79 that have been opened. When therefore the polarity of the current from armature 77 is reversed to bring about the rotation of the motor and the turntable in the opposite direction, the position of the armature of polarized relay 84 is reversed to open contacts 86 and close contacts 85, thus again completing the motor operating circuit that had been interrupted by the opening of contacts 79. At the same time the opening of contacts 86 leaves contacts 80 unshunted and effective to interrupt the motor energizing circuit when opened by cam 83 at the limit of the counter-clockwise movement of the turntable. A subsequent reversal of polarity in the motor energizing circuit again to rotate the turntable in a clockwise direction closes at contacts 86 the energizing circuit that had been interrupted by the opening of contacts 80. If through failure of relay 84 to operate properly or for any other reason the turntable should continue to rotate beyond its limiting positions, one or the other of the emergency limit switches 81 and 82 will be operated to break the energizing circuit and stop the rotation. Means, not shown, are provided for effecting manually the reclosing of the energizing circuit in case this emergency condition should arise.

As has been indicated in the foregoing description, any one of the three motors that respectively bring about the horizontal, vertical and focusing movements of the camera may be caused to rotate in one direction or the other or brought to rest by the manipulation of the corresponding switch by the observer at the receiving station. If desired, the camera motion may be linear instead of angular. The condition of rest of each of the motors corresponds to a condition of phase balance in the associated phase shifter at the receiving station and phase detector at the sending station. This is the condition where the reactance to the resistance ratio is approximately unity and the phases of the electromotive forces of conjugate transformers 55 and 56 of the corresponding phase detector at the sending station are in quadrature. As long as this condition exists there is a condition of output balance with no resultant output from the generator to the armature of the corresponding camera motor.

However, inasmuch as a certain amount of phase distortion may be introduced in the transmission line over which the unshifted reference frequency and the phase shifted control frequencies are conveyed from the receiving station to the sending station, it is necessary to provide for this contingency by including phase shifting networks in the terminal equipment of each channel at the sending station, by the adjustment of which networks a compensating correction is introduced to reestablish at the sending station the phase quadrature relation that normally exists at the receiving station between the control channels and the reference channel. It is not thought necessary to illustrate these phase correcting networks, as they are essentially like the phase shifters illustrated at the receiving station.

Figure 5:
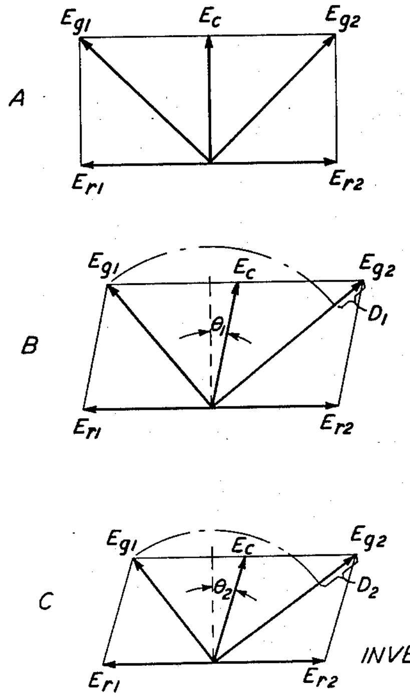
Fig. 5 is a series of graphical representations illustrating the effect of phase shift upon the resultant voltages applied to the grids of the phase detector.

The manner in which the relation of the phase of the control frequency to the phase of the reference frequency determines the condition of input and output balance or unbalance, and therefore the operation of the camera controlling motor, is represented graphically in the charts of Fig. 5. In chart A of Fig. 5, the phase of the control voltage $E_c$ is in quadrature with the phase of the reference voltage $E_{r1}$, $E_{r2}$. In terms of the circuit of Fig. 2, the control voltage is developed in transformer 56 of twin triode tubes 57, 58, and the reference voltage is developed in transformer 55 of these tubes. The vector sum of the control voltage and half the reference voltage is applied to tube 57, and the vector sum of the control voltage and the other half of the reference voltage to tube 58. The magnitude and direction of the resultant voltages applied to the grids of the tubes are represented by the parallelogram diagonal lines terminating in the arrowheads at $E_{g1}$ and $E_{g2}$, respectively. Under the quadrature relationship shown in chart A of Fig. 5, these resultant grid voltages are equal, and therefore the output currents of the two twin triode elements are equal.

When the phase of the control frequency is displaced from quadrature relationship with the phase of the reference frequency, the result is as shown in chart B of Fig. 5. Here the phase of the control frequency is represented as being displaced by an angle $\theta_1$ from the quadrature relationship of chart A, and the resultant voltage $E_{g2}$ applied to the grid of element 58 is greater than the voltage $E_{g1}$ applied to the grid of element 57 by an amount equal to $D_1$. Consequently the output current flowing in the primary winding of transformer 62 is proportionately greater than the output current flowing in the primary winding of transformer 61. As the rectified output currents of the two transformers are in a state of unbalanced series opposition and determine the potential drop across the corresponding equal resistances 68 and 69, the grid of tube 70 of the field supply circuit has a lesser positive potential than the grid of tube 71, and the resultant current unbalance in the differential field windings 75 and 76 causes the generator armature 77 to develop a current the magnitude and direction of which is proportionate to the magnitude and direction of unbalance in the field windings. This in turn correspondingly controls the speed and direction of rotation of the associated camera control motor.

The degree of phase displacement from quadrature of control frequency $E_c$ thus determines the speed of rotation of the corresponding camera control motor, and the direction of displacement from quadrature determines the direction of rotation of the motor. In the charts of Fig. 5, the absolute values of $E_c$, $E_{r1}$ and $E_{r2}$ are represented as being equal to each other. But as long as $E_c$ is in quadrature with $E_{r1}$ and $E_{r2}$, the resultant voltages $E_{g1}$ and $E_{g2}$ will have equal values regardless of the relative amplitude of $E_c$ with respect to equal amplitudes of $E_{r1}$ and $E_{r2}$ greater or less than the amplitude of $E_c$. The control is therefore not critical as to the absolute amplitudes of the control and reference frequencies applied to transformers 56 and 55 as long as the relative amplitudes developed in and applied by these transformers have the above-mentioned relations with each other.

If the transmission condition of these control and reference frequencies should be such as proportionately to reduce the absolute amplitudes of their voltages in the phase detector, the only effect is to increase the required amount of phase shift from quadrature in order to develop the degree of unbalance required to initiate the rotation of the associated motor. This condition is illustrated in chart C of Fig. 5. This chart graphically illustrates a condition in which the absolute voltage values of $E_c$, $E_{r1}$ and $E_{r2}$ are reduced to seven-eighths of the absolute values represented in chart B. If it is assumed that the difference $D_1$ between $E_{g1}$ and $E_{g2}$ is the degree of unbalance required to initiate the rotation of the motor, and that this degree of unbalance is attained by a phase displacement from quadrature equal to the angle $\theta_1$, then with the reduced absolute voltages of the control and reference frequencies indicated in chart C, the same necessary degree of unbalance $D_2$ is effected by the somewhat greater phase displacement from quadrature indicated by the angle $\theta_2$. The system therefore may be seen to have the advantage of not being sensitive to relatively substantial level changes in the absolute values of the transmitted control and reference frequencies.

To review briefly and correlate the various steps in the operation of the system, the horizontal control, vertical control and focus control members of the corresponding phase shifters at the receiving station are normally so set as to produce a resistance-to-reactance ratio of unity in their respective phase shifters, and therefore to cause each corresponding control frequency to be in phase quadrature with the common transmitted reference frequency. These three control frequencies and the common reference frequency are modulated each into its respective carrier frequency at the receiving station and transmitted over four corresponding channels of a common carrier line to the sending station.

At the sending station each of the four control and reference frequencies is recovered by demodulation, phase distortion correction is applied if necessary to reestablish the normal quadrature relation of each control frequency with the common reference frequency, and the reference frequency and one of the control frequencies is connected with the transformers of each of the phase detectors. The output of each of the two thermionic elements of each of the phase detectors is applied through a transformer to a separate full wave rectifier, and the voltage created by the potential drop of the opposed currents from each pair of full wave rectifiers is applied to the grids of the tubes of the corresponding field supply balanced amplifier circuit, the outputs of which tubes differentially energize the field windings of the corresponding generator.

As long as a condition of balance as determined by the phase shifter at the receiving station exists, the effects of the two field windings will be in canceling opposition, there will be no resultant field, and therefore no electromotive force developed in the associated generator armature. When the associated phase shifter at the receiving station is operated to create a condition of unbalance in one direction or the other, a corresponding condition of unbalance will be created in the field windings, and current will be produced in the generator armature corresponding in magnitude and direction of flow with the magnitude and direction of unbalance controlled by the phase shifter at the receiving station. This current passes by way of the contacts and associated apparatus of the limit switch to the armature of the corresponding camera controlling motor, determines the direction and speed of rotation of the motor, and therefore the direction and magnitude of movement of the turntable or other mechanism moved by the motor. The observer at the remote receiving station is thus enabled to control the pointing and focusing of the camera at the sending station and to check on the viewing screen the result of his controlling manipulations.

It is obvious that the principles of this invention can be applied also to the control of brightness or magnification or to some other functional control of the camera. Moreover, instead of carrier channels the transmission means can be a pulse position or pulse code modulation radio link or any other available transmission channel or means. Various other changes can be made in the embodiment described above without departing from the spirit of the invention, the scope of which is indicated by the claims.

What is claimed is:

1. In a television system, transmitting apparatus at a television transmitting station including a television camera and means for forming within said camera an optical image of a portion of a field of view, said last-mentioned means including adjustable focusing means, receiving apparatus at a receiving station for synthesizing an image from currents received from said transmitting station, and means under control of an observer of said synthesized image for orienting and focusing said camera comprising three members adapted to be manually controlled by said observer, three phase detectors at said transmitting station, means at said receiving station for transmitting to said transmitting station an alternating reference current along with three auxiliary currents of the same frequency as said reference current which auxiliary currents have respective phase relations to said reference current dependent upon the positionings of said manually controlled members respectively, said manually controlled members comprising two phase shifting elements having a common movable hand-operated actuating member permitting said two phase shifting elements to be varied simultaneously, each in either of two opposite directions, at different interrelated speeds or either to be so varied without varying the other, and a third phase shifting element operable by the observer, without varying either of said two first-mentioned phase shifting elements, to cause a phase shift in either direction, means for impressing upon two of said phase detectors respectively the two of said auxiliary currents which are under control of said common actuating member together with respective portions of said reference current, two reversible direct current motors respectively under control of said two of said phase detectors for respectively adjusting the position of said image with respect to said camera either backwardly or forwardly in a horizontal direction and adjusting said image either upwardly or downwardly, means for impressing the third one of said currents upon a third one of said phase detectors together with a portion of said reference current, and a third reversible direct current motor under control of said last-mentioned phase detector for adjusting said focusing means either backwardly or forwardly.

2. In a television system, transmitting apparatus at a television transmitting station including a television camera and means for forming within said camera an optical image of a portion of a field of view, receiving apparatus at a receiving station for synthesizing an image from currents received from said transmitting station, and means under control of an observer of said synthesized image for orienting said camera, comprising two members adapted to be manually controlled by said observer, two phase detectors at said transmitting station, means at said receiving station for transmitting to said transmitting station an alternating reference current along with two auxiliary currents of the same frequency as said reference current which auxiliary currents have respective phase relations to said reference current dependent upon the positionings of said manually controlled members, respectively, said manually controlled members comprising two phase shifting elements having a common movable hand-operated actuating member permitting said two phase shifting elements to be varied simultaneously, each in either of two opposite directions, at different interrelated speeds or either to be so varied without varying the other, means for impressing upon the two said phase detectors, respectively, the two said auxiliary currents which are under control of said common actuating member together with respective portions of said reference current, and two motors respectively under control of said two phase detectors for respectively adjusting the position of said image with respect to said camera either backwardly or forwardly in a horizontal direction and adjusting said image either upwardly or downwardly.

3. In a television system, transmitting apparatus at a television transmitting station including a television camera and means for forming within said camera an optical image of a portion of a field of view, said last-mentioned means including adjustable focusing means, receiving apparatus at a receiving station for synthesizing an image from currents received from said transmitting station, and means under control of an observer of said synthesized image for orienting and focusing said camera comprising a plurality of members adapted to be manually controlled by said observer, a plurality of phase detectors at said transmitting station, means at said receiving station for transmitting to said transmitting station an alternating reference current along with a plurality of auxiliary currents of the same frequency as said reference current which auxiliary currents have respective phase relations to said reference current dependent upon the positionings of said manually controlled members, respectively, said manually controlled members comprising a plurality of phase shifting elements, means for impressing upon said phase detectors, respectively, said auxiliary currents together with respective portions of said reference current, and a plurality of reversible motors respectively under control of said phase detectors for respectively adjusting the position of said image with respect to said camera.

RUSSELL C. NEWHOUSE.
FREDERICK W. REYNOLDS.

REFERENCES CITED

The following references are of record in the file of this patent:

UNITED STATES PATENTS

| Number | Name | Date |
|---|---|---|
| 1,450,966 | Affel | Apr. 10, 1933 |
| 2,183,725 | Seeley | Dec. 19, 1939 |
| 2,306,862 | Bown | Dec. 29, 1942 |
| 2,403,023 | Reynolds | July 2, 1946 |
| 2,416,562 | Alexanderson | Feb. 25, 1947 |
| 2,417,446 | Reynolds | Mar. 18, 1947 |
| 2,424,569 | Moseley | July 29, 1947 |